United States Patent [19]
Frankel

[11] Patent Number: 5,020,755
[45] Date of Patent: Jun. 4, 1991

[54] HANDLE SUPPORT ASSEMBLY

[75] Inventor: Gail B. Frankel, Dallas, Tex.

[73] Assignee: Kel-Gar, Inc., Dallas, Tex.

[21] Appl. No.: 460,860

[22] PCT Filed: Jun. 1, 1989

[86] PCT No.: PCT/US89/02402
§ 371 Date: Jan. 31, 1990
§ 102(e) Date: Jan. 31, 1990

[87] PCT Pub. No.: WO89/11810
PCT Pub. Date: Dec. 14, 1989

[51] Int. Cl.$^5$ ............................................. E04G 3/00
[52] U.S. Cl. ......................................... 248/215; 211/74; 211/88; 211/113; 248/227; 248/301; 248/304; 248/311.2
[58] Field of Search ............ 248/215, 227, 230, 231.8, 248/301, 304, 305, 311.2, 313, 339, 340; 211/74, 88, 113

[56] References Cited

U.S. PATENT DOCUMENTS

| | | | |
|---|---|---|---|
| D. 228,335 | 9/1973 | Jackson | 248/311.2 X |
| 1,069,160 | 8/1913 | Meltz | 248/230 |
| 2,437,331 | 3/1948 | Murray et al. | 248/227 X |
| 2,461,071 | 2/1949 | Mettenleiter | 248/227 |
| 2,506,119 | 5/1950 | Tregear | 248/228 |
| 3,603,549 | 9/1971 | Brilando et al. | 248/313 X |
| 3,904,041 | 9/1975 | Medgebow | 248/215 X |
| 4,203,175 | 5/1980 | Heine | 248/215 X |
| 4,410,115 | 10/1983 | McClain, Jr. et al. | 248/215 X |
| 4,436,232 | 3/1984 | Zane et al. | 248/311.2 X |
| 4,767,092 | 8/1988 | Weatherly | 248/311.2 |
| 4,844,400 | 7/1989 | Jasmagy, Sr. | 248/311.2 |
| 4,856,744 | 8/1989 | Frankel | 248/227 X |
| 4,896,858 | 1/1990 | Sokolski et al. | 248/231.8 |

FOREIGN PATENT DOCUMENTS 0001236 of 1892 United Kingdom ................ 248/215

Primary Examiner—Ramon O. Ramirez
Attorney, Agent, or Firm—Johnson & Gibbs

[57] ABSTRACT

A support assembly for utilization with generally horizontal handles, bars, shafts and the like for securement of articles thereto. The support assembly includes both a unit which is integrally formed with a handle and a discrete assembly for attachment to handles. The assembly is preferably of integrally molded plastic that comprises at least first and second hook portions adapted for supporting articles such as packages, clothes and purses from strollers, carts and the like. The assembly may also include a receptacle region adapted for the retention of a canned drink, baby bottle, loose articles or the like. The assembly provides a myriad of hook configurations and demountable attachment sections for the securement of loose articles such as purses, sweaters, towels or other infant items. In this manner, strollers, bicycles and the like may be rendered safer and more convenient for the user who must handle loose articles.

18 Claims, 8 Drawing Sheets

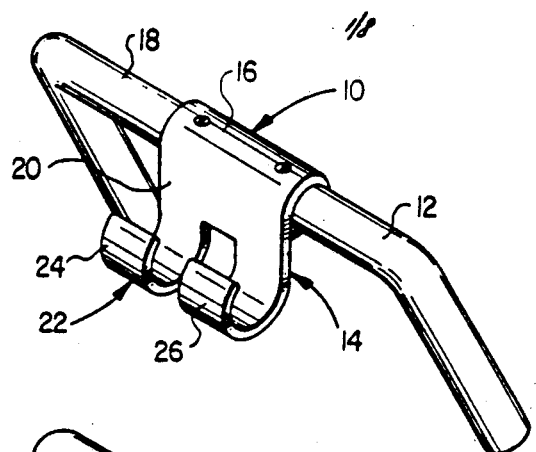
FIG. 1
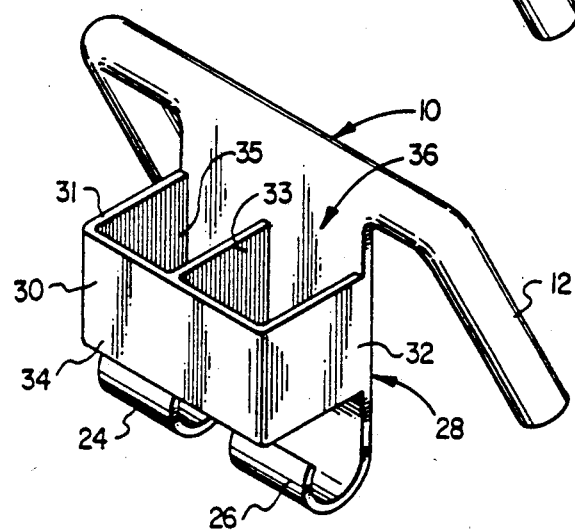
FIG. 2
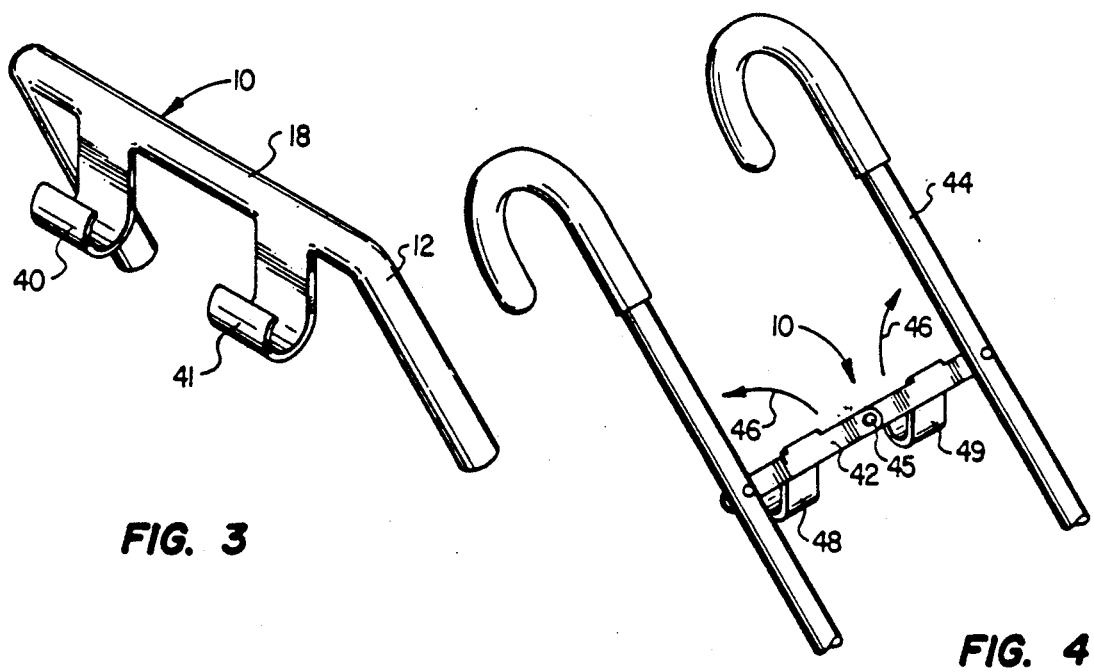
FIG. 3
FIG. 4

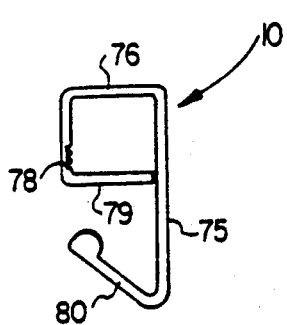
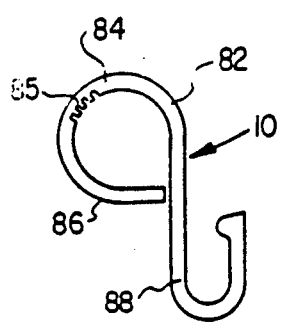
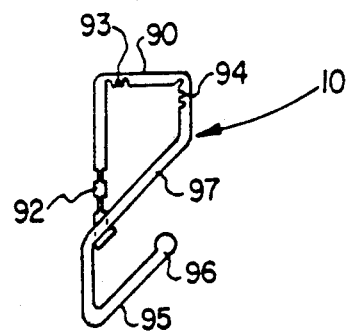
FIG. 7  FIG. 8  FIG. 9
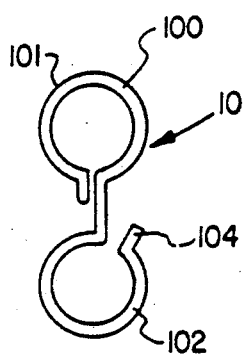
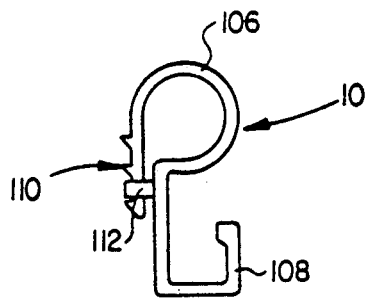
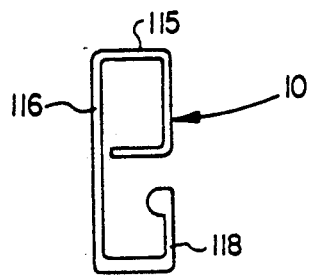
FIG. 10  FIG. 11  FIG. 12
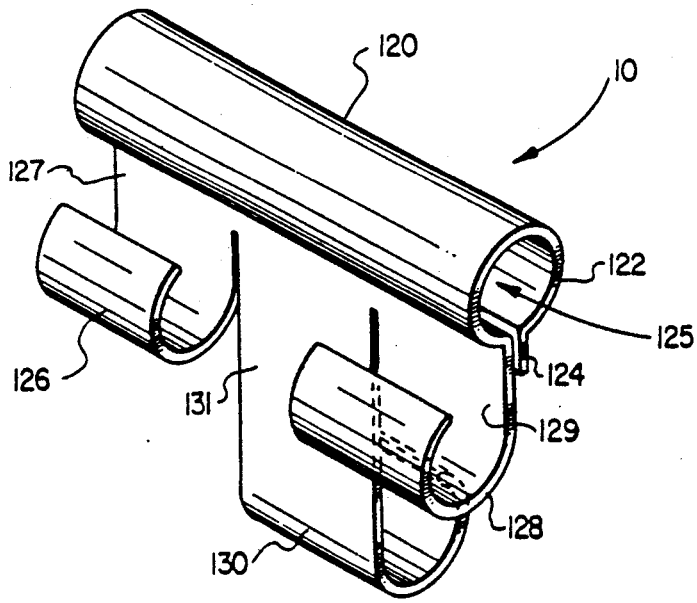
FIG. 13

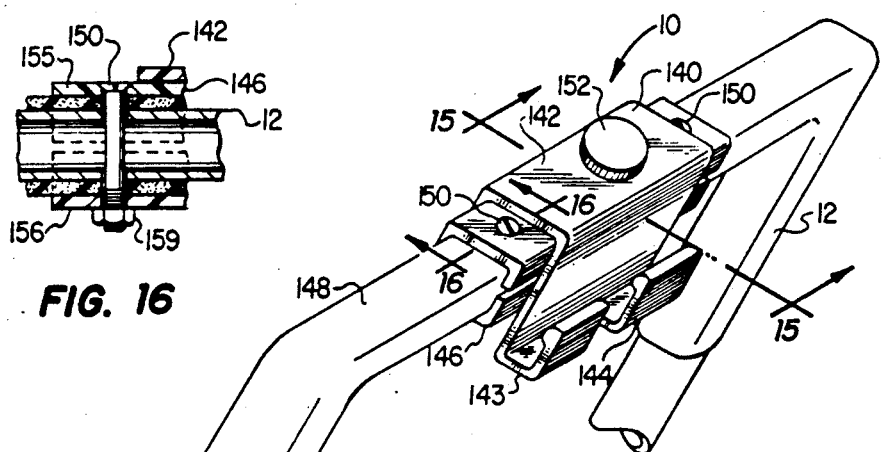
FIG. 16
FIG. 14
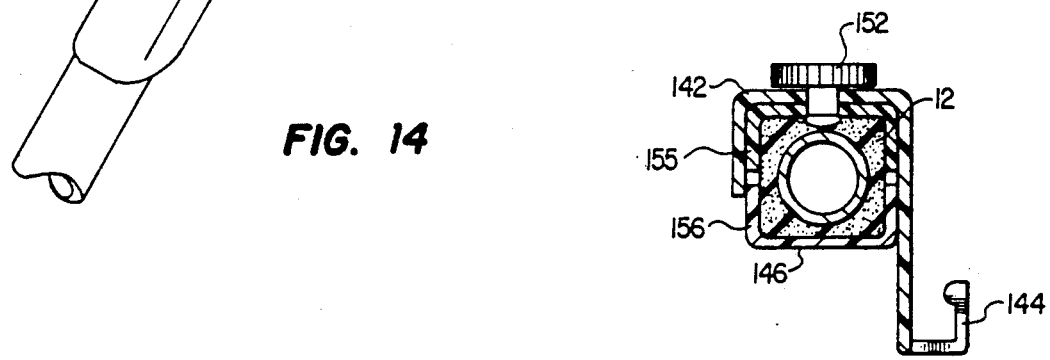
FIG. 15
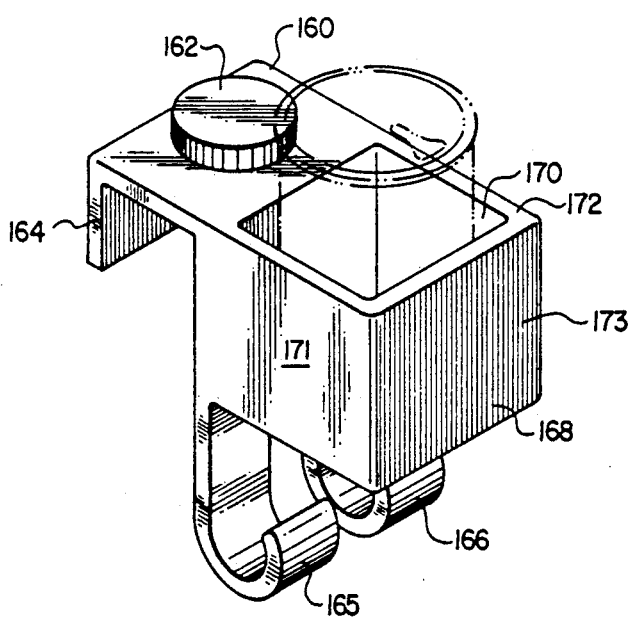
FIG. 17
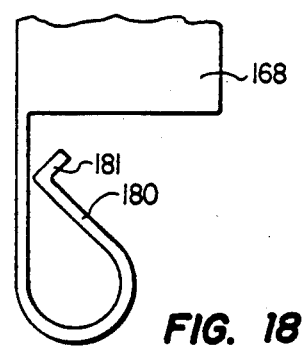
FIG. 18
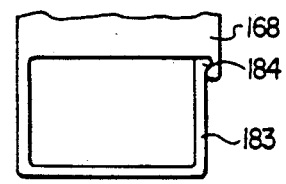
FIG. 19

HANDLE SUPPORT ASSEMBLY

Related Application

This application is related to U.S. patent Ser. No. 07/201,480, filed Jun. 1, 1988, and hereby incorporated by reference as if reproduced in its entirety, and now U.S. Pat. No. 4,856,744.

FIELD OF THE INVENTION

The present invention pertains to handle support fixtures and, more particularly, to an article support assembly adapted for integral formation with or demountable attachement to handles of strollers, carts, bicycles and the like.

BACKGROUND OF THE INVENTION

The art is replete with portable article carrying units. These units have been designed and constructed for support of a myriad of items and for a plurality of applications. The items includes beverages, books, newspapers and small personal items. Their applications include securement to bicylce handle bars, grocery baskets, crutches and similar devices adapted for facilitating ambulatory motion with the conveyance of associated articles. It is not uncommon for such assemblies to have designs adapted specifically for the primary article support application. For example, shopping basket support assemblies have included configured plate assemblies adapted for interengaging the orthogonal frame basket members in a fashion facilitating stability of the configured plate. Such a plate has been constructed for supporting beverage containers as shown in U.S. Pat. No. 2,633,278. It may be seen in this 1953 patent that the overall configuration affording said stability and ease in assembly in unique to this particular application.

Numerous other attachment devices have been the subject of innovation in the art. For example, U.S. Pat. No. 1,134,577 illustrates a bicycle handle bar connection assembly affording support for a basket. Although this is a somewhat antiquated design (1915), it illustrates the importance of freedom of the user's hands relative to handle bars and the like. More recent developments include handle assemblies for more conventional ambulatory assistance structures. Wheelchairs, for example, are designed to assist the physically impaired and therefore convenience assemblies mounted to the wheelchair facilitate both the wheelchair operator and/or those persons assisting the wheelchair operator. Such assemblies include beverage container supports and clipboard mountings to allow the wheelchair occupant immediate access to the article supported thereby. Indeed, it is the ability to afford the occupant, or controller of the particular vehicle for which the handle bar is associated, ease in access that comprises the most important utilitarian function of the mounting. The method and apparatus of attachment have thus been the subject of individual design and engineering considerations. Many of these designs and considerations have been deemed novel throughout the previous decades for a plurality of vehicle and/or frame structures generally associated with ambulatory motion.

Structures associated with ambulatory motion include not only wheelchairs but also bicycles, crutches, shopping carts, and infant strollers. These articles generally require attention by the operator or, in the case of wheelchairs and crutches, by the patient. In these instances, the hands of the patient are generally fully occupied in controlling the wheelchair or the crutch. Even so, access to objects such as drinking containers or related support articles is necessary for the convenience and comfort of the user. Relative to handle bars for bicycles, strollers, shopping carts and the like, it is often necessary for the user to manually steer the particular wheeled structure. It is clearly an encumbrance for the user to also deal with loose articles such as purses, sweaters, drinks, or infant care articles while handling a stroller or cart. Many innovations in the art have thus addressed these various utilitarian needs by the provision of mechanical assemblies adapted for mounting to handle bar areas for particular structures and applications. U.S. Pat. No. 4,071,175 teaches a beverage container holder for a handle bar which permits its attachment in a convenient location and orientation. The same holds true for U.S. Pat. No. 4,312,465 and 4,570,835 which teach related beverage container holder supports facilitating user operation. These references manifest the advantages and need for such innovation.

A distinct area of need in handle bar support structures adapted for facilitating the convenience of the user is not only a beverage container support but means for easily supporting the loose articles described above. In the case of shopping carts and baby strollers, it is common for the operator to carry loose sweaters, purses, shopping bags and/or infant care bags. Without proper securement of these articles relative to the shopping cart or stroller, both inconvenience and danger can result due to lack of attention by the operator in the event that the articles become loose, dislodged and/or generally unsecured. It would be a distinct advance over the art to provide a support assembly specifically adapted for handle bar regions for strollers, carts and the like facilitating the support of the aforesaid articles in a safe, convenient and economical fashion. The method and apparatus of the present invention provide such an assembly in an integrally formed article support adapted for securement to, or integration with, handle bars and the like.

SUMMARY OF THE INVENTION

The present invention relates to handle bar support accessories for the securement of collateral articles. More particularly, one aspect of the present invention comprises a handle bar support assembly integrally formed with a plurality of hook shaped elements adapted for the securement and support of articles therefrom relative to the handle bar upon which the assembly is attached.

In another aspect, the invention includes a support assembly for use with a handle on a stroller or the like comprising an integrally formed body portion and handle engaging means integral with and extending generally upwardly from the body portion. The handle has means adapted to engage a generally horizontal portion of a stroller handle. Hook means integral with and extending generally downwardly from the body portion are available for selective hooking engagement with articles to be supported by the assembly; said hooking means possesses a secondary fastening means for complementary use with ancillary fixtures attachable to the support assembly. The handle engaging means may be integrally connected to said handle or include threaded fastener means for connection to the handle. In the latter case, the handle engaging means comprises gripping means frictionally engagable with the handle.

In yet another aspect, the invention includes a support assembly for use with a handle on a stroller or the like comprising an integrally formed body portion and handle engaging means integral with and extending generally upwardly from the body portion with means adapted to engage a generally horizontal portion of a stroller handle or the like. Hook means integral with and extending generally downwardly from the body portion provide selective hooking engagement with an article to be supported by the assembly. The hook means comprise at least a pair of hooks in one embodiment and a clamp hook in another. Likewise, the hook means are positioned directly between the handle engaging means in one embodiment and in a laterally offset position from the handle engaging means in another. The hooks may face in opposite directions or the same direction. Moreover, a beverage container holding means may extend generally laterally from the body portion. The beverage container holding means may comprise a generally upright wall means for at least partially surrounding a beverage container and the wall means can define compartments for a plurality of beverage containers.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a fragmentary perspective view of one embodiment of the article support apparatus of the present invention;

FIG. 2 is a fragmentary perspective view of an alternative embodiment of the article support apparatus of FIG. 1;

FIG. 3 is a fragmentary perspective view of another alternative embodiment of the article support apparatus of FIG. 1;

FIG. 4 is a fragmentary perspective view of yet another alternative embodiment of the article support apparatus of FIG. 1;

FIG. 7 through FIG. 12 are side elevational view of alternative constructional embodiments of the article support assembly of FIG. 6;

FIG. 13 is an enlarged perspective view of another embodiment of the article support assembly of FIG. 6;

FIG. 14 is a perspective view of an attachable article support assembly illustrating yet another embodiment of the present invention;

FIG. 15 is an enlarged cross-sectional view of the article support assembly of FIG. 14 taken along line 15—15;

FIG. 16 is an enlarged cross-sectional view of the article support assembly of FIG. 14 taken along line 16—16;

FIG. 17 is an enlarged perspective view of an alternative embodiment of the attachable article support assembly of FIG. 14;

FIG. 18 is a fragmentary side elevational view of an alternative embodiment of the article support assembly of FIG. 17;

FIG. 19 is a fragmentary side elevational view of an alternative embodiment of the article support assembly of FIG. 18;

DETAILED DESCRIPTION

Figure 5:
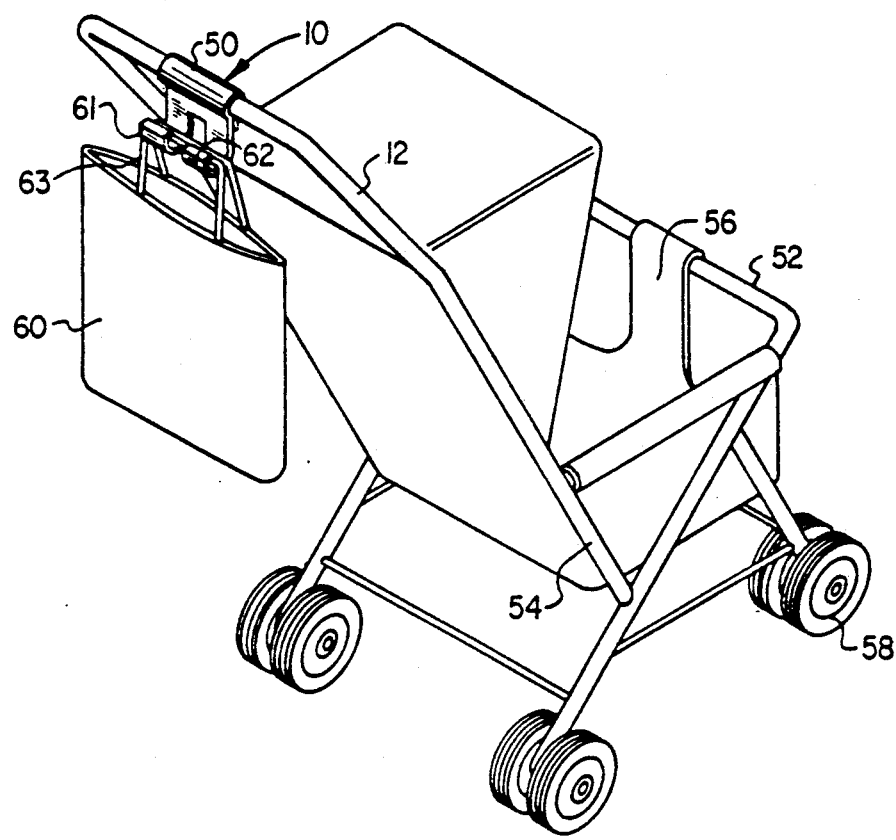
FIG. 5 is a perspective view of yet another article support assembly secured to a baby stroller to illustrate an aspect of the present invention.

Referring first to FIG. 1, there is shown a perspective view of a support hook assembly 10 screw mounted to handle 12. Handle 12 may be of the type utilized for strollers, buggies, bicycles, carts, and other conventional ambulatory assistance devices. The support assembly 10 comprises a body portion 14 having an upper handle engagement region 16 adapted for attachment with an integrally formed handle body 18 by means of a threaded screw. An intermediate body portion 20 is constructed of a substantially planar configuration region 20 which descends into a lower hook region 22 comprising a first hook section 24 and a second hook section 26. Each of the hook sections 24 and 26 are formed in a curvilinear configuration adapted for facilitating the attachment of a handle of a purse, a sweater or the like. As shown herein, the article support assembly 10 is adapted for facilitating such ease of attachment. This integral configuration of the article support assembly 10 and handle 12 is but one embodiment of the present invention.

Referring now to FIG. 2 there is shown an integral construction of an alternative embodiment of article support assembly 10 incorporating a beverage container holder. The body portion 28 of the article support assembly 10 comprises a compartment 30 adapted for receiving and securing first and second beverage containers. The compartment 30 is constructed of substantially planar sidewalls 31 and 32 with an intermediate wall 33 disposed therebetween and frontal wall 34 therein defining a first beverage container holding section 35 and a second beverage container holding section 36. Beneath beverage container holding sections 35 and 36 are disposed hook sections 24 and 26 of the type shown in FIG. 1. In this particular embodiment, handle 12 may be utilized with a stroller for facilitating both the attachment of purses and loose articles as well as containing beverages during the use of the stroller for which handle 12 is attached.

Referring now to FIG. 3, there is shown yet another embodiment of an integral hook assembly for handle 12. Article support assembly 10 as shown herein comprises first and second hook sections 40 and 41 integrally formed with top handle bar portion 18. In this configuration, handle 12 facilitates the attachment of articles by the utilization of two integrally molded hook sections formed in a curvilinear configuration.

Referring now to FIG. 4, there is shown yet another alternative embodiment of article support assembly 10 of the present invention as it is secured to a cross bar 42 of a stroller handle assembly 44. Cross bar 42 is pivotally mounted in the center at a point 45 permitting its pivotal actuation for the collapse of the stroller 44 in a conventional fashion. Arrows 46 illustrate the manner in which the cross bar 42 is permitted to flex about pivot point 45. Again, a pair of hooks 48 and 49 are integrally formed with cross bar member 42 for facilitating the attachment of loose articles thereto as described and illustrated above.

Referring now to FIG. 5, there is shown article support assembly 10 utilizing yet another alternative structural configuration which includes a hook assembly 50. Article support assembly 10 is fabricated from plastic or the like in a configuration which facilitates attachment to handle 12 of a conventional stroller or the like. A stroller 52 is shown in a perspective view for illustrating the functional use thereof. The handle 12 seen to comprise a portion of the overall stroller frame 54 which supports a stroller seat 56 by a set of wheels 58. A child positioned within stroller seat 56 may in this way be dealt with while articles such as purse 60 or the like may be hung from the hook assembly 50. A pair of generally C-shaped hook elements 61 and 62 are provided for supporting the handle 63 of purse 60. It may be seen that not only purse 60 but also other flaccid articles (not shown) such as a sweater or towels can be carried by article support assembly 10. In this way the portion of handle 12 adjacent and on either side of the article support assembly 10 is available for conventional securement by the hands of the user for control of stroller 52.

Figure 6:
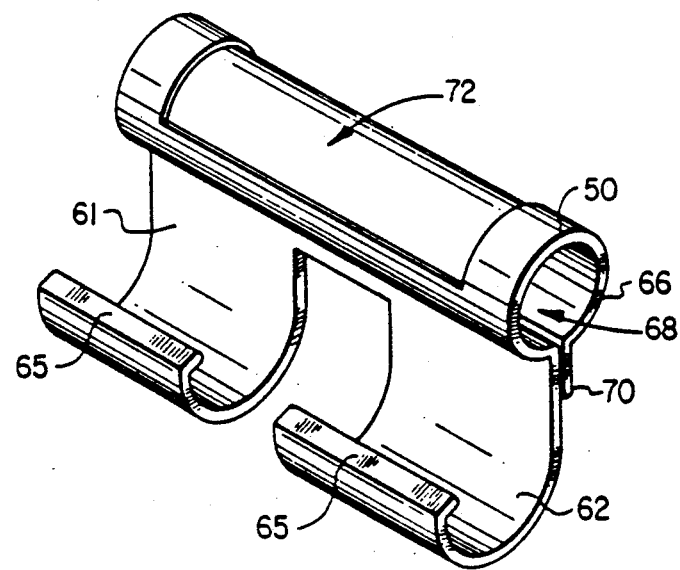
FIG. 6 is an enlarged perspective view of an alternative embodiment of the article support assembly of FIG. 5.

Referring now to FIG. 6, there is shown an enlarged perspective view of the support member of hook assembly 50. In this view, it may be seen that generally C-shaped hook members 61 and 62 are constructed with a generally flat flange region 65 on the upper portion thereof. A tubular body portion 66 is constructed with a central hollow region 68 formed therethrough. A lower lip 70 depends down from the cylindrical body portion 66 for permitting elasticity and depending engagement after attachement to the handle 12. It may be seen that the plastic flexing action permits attachment to a plurality of handles. A recess area 72 is also provided to enable a label to be affixed therein for identification purposes. This assembly facilitates an easy-on and easy-off, nonpermanent, installation for strollers and the like. In this manner the particular article support assembly 10 can be secured to any number of handles 12 including various strollers, carts and buggies.

Referring now to FIGS. 7 through 12, a plurality of cross sectional configurations are illustrated for the attachable article support assembly 10. Each article support assembly 10 is provided with its own identification number for purposes of further illustration. For example, FIG. 7 comprises an attachable assembly 75 having a generally rectangular handle engagement portion 76. The handle engagement portion 76 includes a serrated area 78 facilitating the flexibility of the lower member 79 around handle bars and the like. Without such a design sufficient flexibility may not be possible without breakage. The actual hook region 80 is constructed for easy attachment of any of the plurality of garments or handles. The hook region 80 is seen to be oriented directly beneath the handle section 76 as compared to the generally "figure 8" configuration shown in FIG. 8. In FIG. 8, a hook assembly 82 is constructed in a generally "figure 8" shape. A handle engagement portion 84 is constructed with serrations 85 facilitating the expansion of the body portion 86 around a handle or the like. A depending body portion 88 is constructed in a generally U-shaped configuration for holding straps and loose articles as defined above.

Referring now to FIG. 9, there is shown an adjustable clasp 90 having a snap-down vertical clasp configuration formed by depending section 92. Expansion sections 93 and 94 are likewise constructed therein for purposes of allowing flexibility and the lower hook section 95 is constructed with the lower base member 96 aligned in generally parallel spaced relationship with upper clasp member 97. This is yet another cross sectional configuration comprising an alternative embodiment of the article support assembly 10 of the present invention.

Referring now to FIG. 10, there is shown yet a further symmetrical clasp and article support assembly 10 in a reversible design. The symmetrical clasp 100 shown herein includes an upper cylindrical attachment section 101 and a lower cylindrical hook section 102. The hook section 102 has an outwardly flared flange 104 to permit receipt of articles therein. The reversible hook configuration provides aesthetic symmetry as well as depending structural rigidity for purposes of functional and decorative applications. Likewise, FIG. 11 illustrates a vertical clasp assembly 106 having a lower generally rectangular or U-shaped section 108 for providing a hook region therebeneath. Again, the hook region 108 is disposed in alignment with the upper clasp section 106 which may be constructed for adjustable mounting through the serrated portion 110 and fastening section 112. In this manner a number of handle bar configuration sizes and shapes may be secured therewith. FIG. 12 is yet a third version of the symmetrical vertical clasp and hook configuration provided with the hook portion immediately disposed beneath the clasp portion. In this section the rectangular friction clasp 115 includes an upper handle engagement section 116 and lower hook section 118 of generally rectangular design. The overall configuration resembles that of the letter G and provides the general benefits as set forth above.

Referring now to FIG. 13, there is shown a perspective view of yet another alternative embodiment of the present invention. A hook assembly 120 is shown with a cylindrical handle engaging body portion 122 of the aforedescribed expansion shape. A lower snap flange 124 is constructed for permitting outwardly flaring receipt of a handle section (not shown) through the axial region 125 thereof. Three hooks are herewith provided in an opposed or back-to-back configuration. A first hook 126 depends from the upper cylindrical body portion 122 through a transition region 127. A second hook 128 is disposed in generally parallel spaced relationship to hook 126 and is likewise disposed in a position depending from the upper cylindrical body portion 122 through the transition region 129. Finally, a third hook 130 is disposed in a reverse orientation relative to hooks 126 and 128 while depending from upper cylindrical body section 122 through elongate planer transition region 131. It may be seen that this three hook design in assembly 120 provides a friction clasp assembly facilitating attachment to not only strollers but also grocery and shopping carts and the like. Securement to shopping carts is facilitated by the expansion clasp defined above and the availability of the three hooks 126, 128 and 130 affords ease in application and multiplicity in the number of articles that can be supported therefrom.

Referring now to FIG. 14, there is shown an alternative embodiment to the present invention whereby the article support assembly 10 is provided in a permanently attachable configuration by attachment hook 140. The attachment hook 140 is shown to be constructed with an upper generally rectangular body section 142 and two depending hooks 143 and 144 of generally rectangular design. The design and functionality of these hooks is described in some detail above. What is not described above is the means by which this particular configuration is secured to conventional handles 12 of strollers and the like. The hook assembly 140 is constructed with a mounting brace 146 which clamps around the handle the body portion 148 of the handle 12. A pair of threaded fasteners in the forms of screws 150 are utilized to permanently secure the clasp 146 thereto. A threaded mounting nut 152 is likewise provided for permitting mounting, demounting and interchange of the actual hook member 140. This construction is seen in more detail in FIGS. 15 and 16 where cross sections thereof are illustrated. The clasp 146 is shown to be constructed of two sections 155 and 156 that are threadibly connected to one another around the handle 12. The hook 144 shown depending from the upper hook attachment section 142 which is maintained thereon by rotatable fastener 152. Likewise FIG. 16 illustrates the manner of penetration of the handle 12 by threaded member 150 which utilizes a nut 159 on the lower end thereof to secure the lower clamping section 156 to the upper clamping section 155 of the clamping member 146. In this manner, hook 142 can be securably retained on handle 12.

Referring now to FIG. 17 there is shown yet another embodiment of the present invention for facilitating carrying beverage containers. As shown in FIG. 2 beverage container compartments are disclosed above but not in a permanently attachable configuration. Permanently attachable hook assembly 160 is thus shown with an attachment head 162 extending through an attachment section 164 adapted for engaging in the handle bar region as described above. A pair of hooks 165 and 166 is shown depending beneath a beverage container compartment 168 a adapted for supporting the beverage container 170 shown in phantom herein. A generally rectangular configuration is afforded whereby first and second outer walls 171 and 172 provide a generally parallel spaced relationship which is orthogonal to an inner wall 173. A bottom (not shown) is afforded for supporting the beverage container 170 therein. It may be seen that in this configuration the permanently attachable hook assembly 160 can be attached to the clamping mechanism 146 shown in FIG. 14 above. It is the utilization of the clamping mechanism 146 comprising the upper/lower clamping members 155 and 156, respectively, which affords the ability for the permanent mounting and demounting of these units. Consistent therewith a variation in the configuration of the lower hook elements is also illustrated. In FIG. 18 it may be seen that the lower hook elements 165 and 166 in FIG. 17 are provided in a variation of shape, illustrated as clamp hook 180. Clamp hook 180 has an upper flange 181 facilitating the grasp of the user for the purpose of inserting a garment or the like to be securely held therewithin. The utilization of an open hook such as 165 is not as conductive to securement of flaccid articles such as sweaters and towels due to the fact that without the clamping mechanism clearly shown in the hook 180, such articles can become easily dislodged. One of the applications for the present invention is the utilization of such a unit 160 on a bicyle or the like whereby the need may often occur for secured support of flaccid articles in conjunction with the holding of a cold drink. FIG. 19 shows yet another embodiment whereby a hook region 183 is shown in a generally rectangular configuration with an upper detent mating section 184 provided. The beverage container section 168 disposed thereabove thus facilitates the overall construction thereof.

Figure 20:
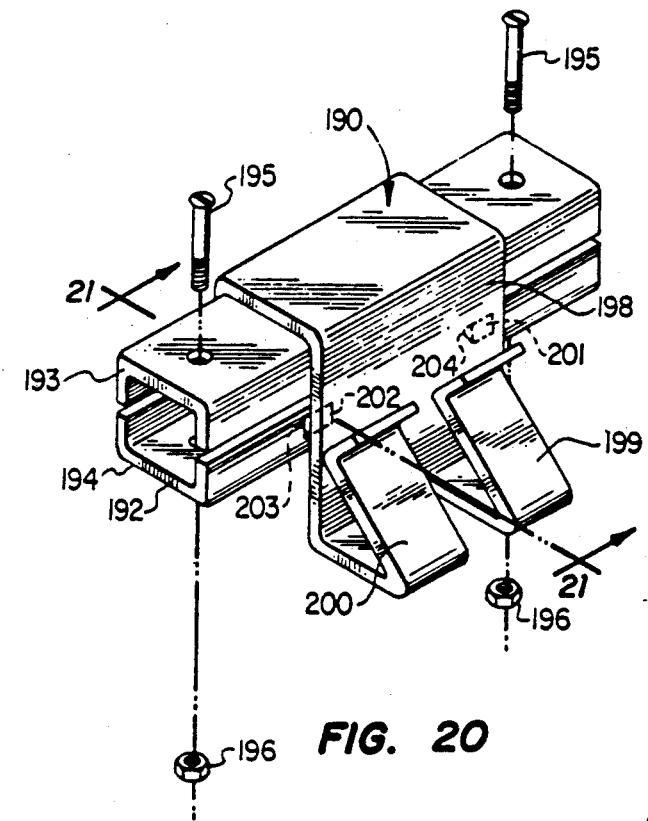
FIG. 20 is an exploded view of yet another alternative embodiment of the attachable article support assembly of FIG. 14.
Figure 21:
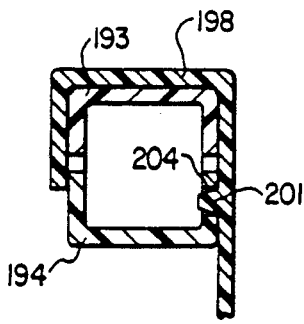
FIG. 21 is a cross-sectional view of the article support assembly of FIG. 20 taken along line 21—21.

Referring now to FIG. 20, there is shown yet another embodiment of the permanent hook attachment mechanism of FIG. 14. As shown in FIG. 14, the securement clasp 146 comprises upper and lower clamping elements. In the present embodiment the attachment bracket 190 is constructed with a clamping assembly 192 comprising upper and lower, generally U-shaped, clamping members 193 and 194 secured by a pair of conventional threaded fasteners 195 extending therethrough. Nuts 196 are shown therebeneath for purposes of secured engagement. The actual clamping member 190 is constructed of a generally rectangular body section 198 having a pair of depending hook sections 199 and 200. The hook sections 199 and 200 are constructed in a slant configuration adapted for securely retained articles positioned therebehind. The body section 198 is demountably secured to the bracket 192 by a pair of tabs 201 and 202 which are insertable into apertures 203 and 204 formed in the lower bracket section 194. In this manner expansion of the body portion 198 will allow sufficient flexibility to permit the member to be secured to the bracket 192. This assembly is further illustrated in FIG. 21 where the generally rectangular body 198 is illustrated in mating engagement over upper clamping member 193 and lower clamping member 194. The tab 201 is shown inserted into aperture 204 formed in lower bracket 194. It is by the flexibility of this member that sufficient securement force is provided for the securement of articles behind the slanted hooks 199 and 200 described above.

Figure 22:
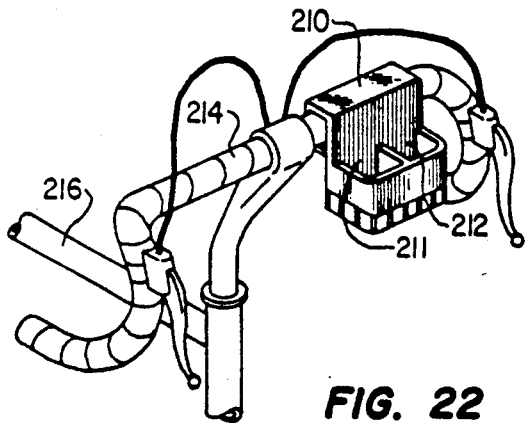
FIG. 22 is a perspective view of an alternative embodiment of the article support assembly of FIG. 20 mounted to the handle bars of a conventional bicycle.
Figure 23:
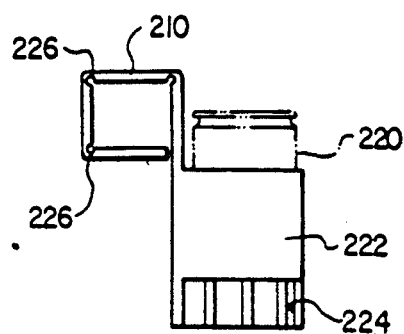
FIG. 23 is an enlarged side elevational view of the support hook assembly of FIG. 22.

Referring now to FIG. 22 there is shown yet a further embodiment of the present invention wherein a beverage container holder 210 is shown with a pair of beverage container sections 211 and 212. This particular assembly is for securement to the handle bars 214 of a conventional bicycle 216 (shown fragmentarily). It may be seen that the attachment of the beverage container holder 210 may be afforded by means of the method and apparatus described above. Likewise FIG. 23 shows one embodiment of such an attachment mechanism whereby the unit 210 supports the beverage container 220 (shown in phantom) in a beverage container section 222 having the lower portion thereof 224 formed in spaced relationship. A series of recesses 226 are provided in the upper rectangular section 210 for purposes of permitting flexibility and expansion for clasping the handle bar 214. Such an expansion is further illustrated in FIG. 24 whereby a series of recesses 228 are shown in a generally cylindrical handle bar engagement section 230 also adapted to a beverage container section 232. In beverage container section 232 a beverage container 234 is shown in phantom. Also shown in phantom is the expanded portion of the cylindrical body region 230 of section 236 whereby the outward flexing thereof to facilitate engagement of the handle bar section 214 is provided. A locking member 238 is likewise included for purposes of securing the engagement around a handle bar or the like.

Figure 24:
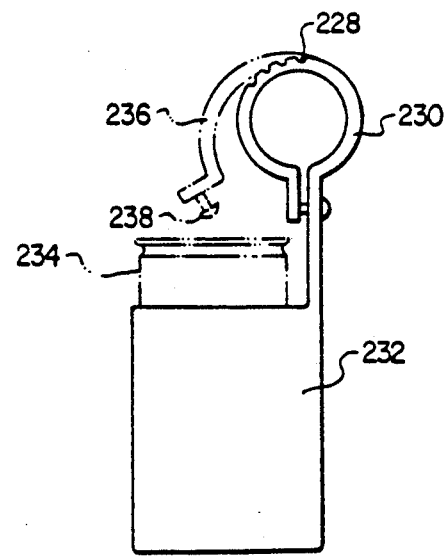
FIG. 24 is a side elevational view of an alternative embodiment of the article support assembly of FIG. 23.
Figure 25:
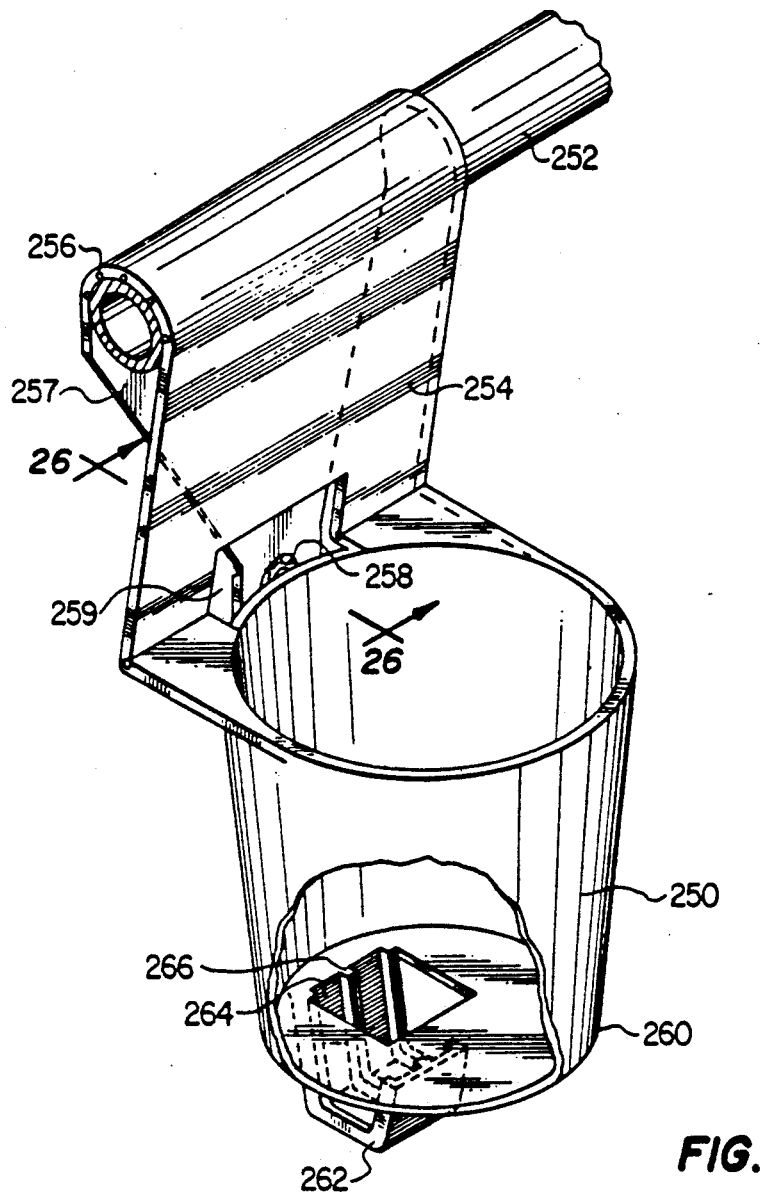
FIG. 25 is a perspective view of an alternative embodiment of a beverage container holder constructed in accordance with the principles of the present invention.

Referring now to FIG. 25 there is shown a perspective view of an alternative embodiment of the beverage container holder of FIG. 24. A tapered beverage container holder 250 is illustrated secured to a cylindrical handlebar 252 of a bicycle, stroller, cart or the like. An attachment region 254 of generally planar construction is provided in an upstanding configuration adjacent the beverage container section. A plurality of recesses 256 have been constructed in attachment region 254 to facilitate its engagement and "wrap around" securement to handlebar 252. In this view a back section 257 of attachment region 254 permits securement of the said attachment region by a locking member 258. A cut out 259 facilitates the molding of attachment region 254 adjacent the tapered walls 260 of the beverage container body portion. It may be seen that the tapered construction of walls 260 facilitate a sufficient draft angle to maximize the simplicity of molding.

Still referring to FIG. 25 the lower body portion thereof is constructed with a hook member 262 adapted for the securement of loose articles as described above. Hook member 262 is formed beneath an aperture 264 formed in the bottom of the beverage container holder. In this configuration injection molding of plastics and the like is greatly facilitated with ribs 266 provided therein for purposes of rigidity and structural reinforcement. It may be seen that the size of the aperture 264 is larger than the lateral width of the top plan of the hook 262 whereby the type of mold may be simplified. The aperture 264 provides not only improved molding techniques but also a drainage aperture for the containment area within tapered walls 260. In this embodiment it may be seen that baby bottles, cold drinks and the like can be conveniently stored during use of the present invention.

Figure 26:
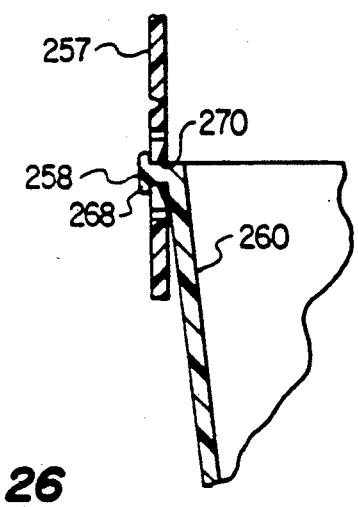
FIG. 26 is an enlarged fragmentary cross-sectional view of a portion of the beverage container holder of FIG. 25 taken along line 26—26.

Referring now to FIG. 26, there is shown an enlarged side elevational cross-sectional view of the locking mechanism 258 taken along lines 26-26 thereof. In this view it may be seen that the back section 257 of attachment section 254 has been brought into flush engagement with the tapered walls 260 and a locking button 268 extends outwardly therefrom. Locking button 268 has an outwardly flared end which facilitates interlocking engagement with an aperture 270 formed within the back section 257. This "snap" locking is inexpensive to fabricate yet provides sufficient structural attachment integrity to permit efficient utilization of tapered beverage container assembly 250. It should be noted that other attachment devices are contemplated in accordance with the principles of the present invention.

The present invention thus teaches a plurality of article support devices in the plurality of configurations. In FIGS. 1 through 4 the article support assemblies 10 are integrally formed with the handle section 12 provide not only a region for supporting loose or flaccid articles and/or straps but also containers directly to strollers, carts and the like. In FIGS. 5 through 13 a flexibly mounting hook assemblage is shown in a myriad of configurations. Each hook is adapted for a particular application and the manner of attachment is described in detail. In FIGS. 16 through 20, both hook and beverage container, permanent attachment configurations are illustrated. These attachment configurations include the utilization of a demountable body portion to a permanent clamping section which affords great versatility as well as utility in the support of both beverage containers and loose articles relative to bicycles, strollers, carts and the like.

Figure 27:
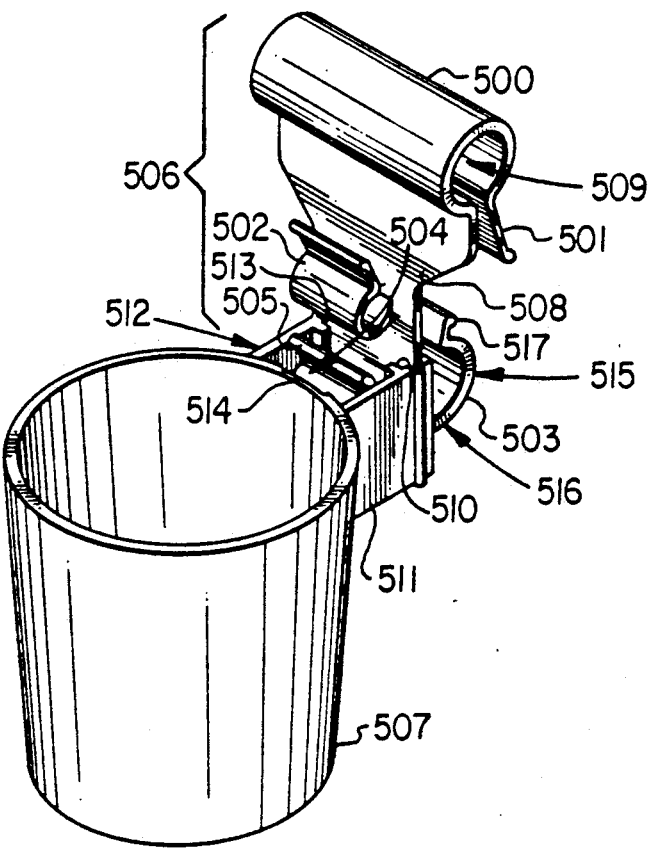
FIG. 27 is a perspective view of yet another article support assembly wherein a cylindrical receptacle is affixed to the article support assembly.

Referring to FIG. 27, there is illustrated a perspective view of yet another embodiment of article support assembly 506 wherein a means for affixing a tapered, cylindrical receptacle 507 exists within the invention. Tapered, cylindrical receptacle 507 is secured to article support assembly 506 in attachment region 504. The attachment region 504 consists of two generally parallel vertically oriented planar appendages 511, 512. Integral with the tip of the interior surface of each appendage exist grooves 510 and 513 which lie face to face forming a thread guiding means for article support assembly 506. Channel 514 operates as a guide for the locking means used to affix article support assembly 506 and the cylindrical receptacle 507.

The article support assembly 506 consists of two parts, the upper, tubular body portion 500, constructed with a central hollow region 509 formed therethrough, and a lower planar body surface 508. A lower lip 501 is flared outward from the tubular body portion 500 to facilitate entry of a plurality of handles into the central hollow region 509. The flexing action of the tubular body portion 500 and lower lip 501 provide the frictional gripping means whereby the article support assembly 506 attaches to a multitude of handles, bars, shafts and the like. Three hooks reside upon the lower planar surface 508 of the support assembly, one large hook 503 on the exterior surface and two smaller hooks, 502 and 505 on the interior surface. More specifically, hook 502 lies above hook 505 and both smaller hooks are aligned in opposing relationship with hook 503. Hook 502, 503 and 505 each possess a generally similar design. Hook 505 displays the general hook configuration consisting of a superior curved section 515, an inferior curved section 516, as well as an outwardly flared flange 517 angled from the superior curved edge to facilitate receipt of articles therein.

Figure 28:
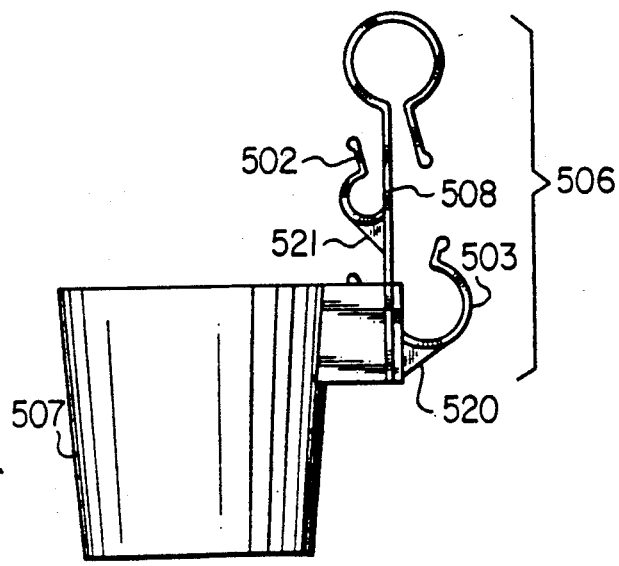
FIG. 28 is a side elevational view of the article support assembly with attached cylindrical receptacle illustrated in FIG. 27.
Figure 29:
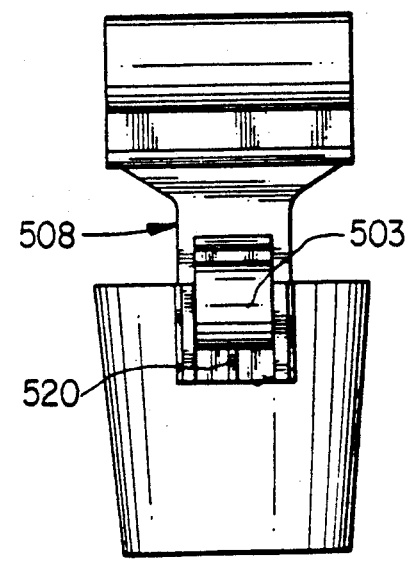
FIG. 29 is a back elevational view of the article support assembly with attached cylindrical receptacle illustrated in FIG. 27.

Referring next to FIG. 28, a side elevational view of article support assembly 506 with the attached tapered, cylindrical receptacle 507 may be seen. This view shows the extent of the outward flaring of opposing hooks 502 and 503. Also disclosed are the reinforcing brackets 520, 521 below the large hook 503 and the upper, opposing small hook 502, respectively. FIG. 29 further illustrates the reinforcing bracket 520 of hook 503. The bracket is integrally formed with both the lower planar surface 508 of the hook assembly 506 and the inferior curved section of the hook.

Figure 30:
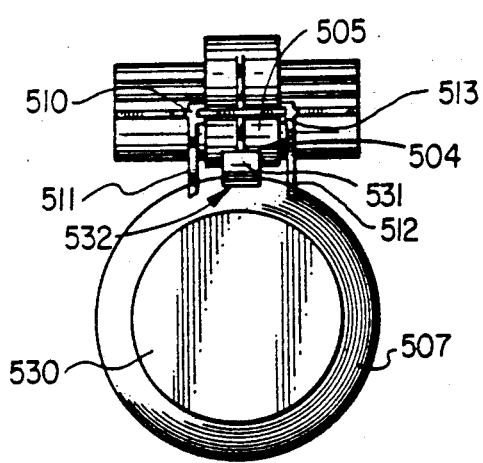
FIG. 30 is a bottom elevational view of the article support assembly with attached cylindrical receptacle illustrated in FIG. 27.

Referring next to FIG. 30, there is shown a bottom elevational view of the article support assembly and attached receptacle. A solid bottom surface 530 underlays the tapered cylindrical receptacle 507 thereby permitting the storage of various loose articles within the receptacle 507. This view clearly illustrates attachment region 504. Complementary grooves 510 and 513 on the tips of the vertical planar appendages 511, 512 create a guiding thread for the edges of the lower surface of the hook assembly. A means for locking the article support assembly 506 to the cylindrical receptacle 507 results from the slidably engagable hook-like fasteners 531 and 532; fastener 531 is integrally placed upon the apex of lower hook 505, and fastener 532 is integrally located upon the outer surface of the cylindrical receptacle 507, between the vertical planar appendages 511 and 512.

Figure 31:
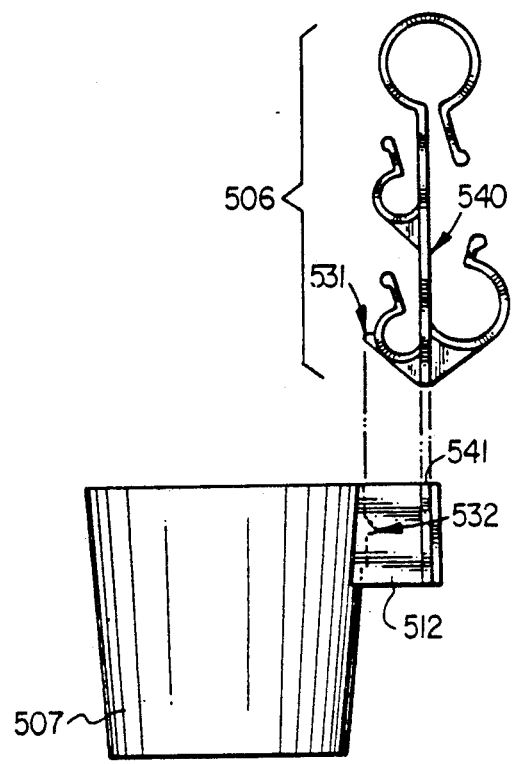
FIG. 31 is an exploded side elevational view of the article support assembly of FIG. 27 detached from the cylindrical receptacle.

Referring next to FIG. 31, an exploded view of the article support assembly 506 and cylindrical receptacle 507 may now be seen. This view more clearly illustrates the locking system utilized by the invention. When connecting article support assembly 506 and the tapered cylindrical receptacle 507, fastener 531 of the article support assembly 506 slides over and subsequently engages fastener 532 located on the surface of the cylindrical receptacle 507. Ridge 540 of the article support assembly 506 impacts with the upper edge 541 of the vertical planar appendage 512 and prevents the article support assembly from sliding through the guide-thread once fasteners 531 and 532 connect.

In such a manner, the embodiment of the invention illustrated in FIGS. 27 through 31 teaches a article support assembly which employs an integrally formed gripping means whereby the assembly unit may be affixed to a multitude of bars, handles, shafts or the like. The support unit possesses hooks that provide a means for suspending various flaccid articles and/or straps. The support unit may be used alone or a receptacle may be attached as a means for storing various loose articles.

Having described the invention in connection with certain specific embodiments thereof, it is to be understood that further modifications may now suggest themselves to those skilled in the art and it is intended to cover such modifications as fall within the scope of the appended claims.

What is claimed is:

1. A support assembly system for use with a generally cylindrical horizontal bar, shaft, or handle comprising:
   a body portion;
   an end portion extending upwardly from said body portion, said end portion including first and second ends and a generally tubular intermediate section for circumferentially and frictionally gripping said generally cylindrical horizontal bar, shaft, or handle, said generally tubular intermediate section integrally formed with said body portion at said first end;
   means for inserting said generally cylindrical horizontal bar, shaft, or handle into said generally tubular intermediate section for circumferential frictional gripping therewith, said means for inserting said generally cylindrical horizontal bar, shaft, or handle into said generally tubular intermediate section further comprising a lip integrally formed with said tubular intermediate section at said section end; and
   hook means extending from said body portion for selective hooking-engagement with an article to be held by said assembly.

2. A support assembly system in accordance with claim 1 wherein said lip is laterally displaceable with respect to said body portion to separate the two, thereby facillitating insertion of said generally horizontal bar, shaft, or handle into said generally tubular intermediate section.

3. A support assembly system in accordance with claim 2 wherein said lip is flared away from said end portion, thereby facilitating the separation of said end portion and said lip.

4. The support assembly system in accordance with claim 1 wherein said hook means further comprises an upper edge which terminates in an extending lip flared away from said body portion, thereby facilitating said hooking of said article.

5. The support assembly system in accordance with claim 4 wherein said hook means further comprises a rigid support leg integral with both said hook means and said body portion.

6. A support assembly system for use with a generally horizontal bar, shaft, or handle comprising:
   a body portion;
   an adaptably engaging attachment end portion extending upward from said body portion, said end portion circumferentially and frictionally gripping said generally horizontal bar, shaft, or handle;
   hook means extending from said body portion for selective hooking with an article to be held by said assembly; and
   a secondary fastening means integral with said hook means whereby securement of an auxillary fixture such as a cylindrical receptacle may occur.

7. The support assembly system in accordance with claim 6 wherein said hook means further comprises an apex, said secondary fastening means residing on said apex of said hook means, and said auxiliary fixture further comprises fastening means complementary to said secondary fastening means, wherein said secondary fastening means slides over and subsequently engages said complementary fastening means to engage said body portion and said auxiliary fixture.

8. The support assembly system in accordance with claim 7 wherein said auxiliary fixture further comprises two generally parallel vertically oriented planar appendages for mating with said body portion.

9. The support assembly system in accordance with claim 8 wherein said body portion further comprises a lower part of reduced width and a wider upper part integral with said lower part, and each of said generally parallel vertically oriented planar appendages further comprise a groove for receiving said lower part of said body portion.

10. The support assembly system in accordance with claim 9 wherein said body portion further comprises a vertically extending notch between said upper and lower parts, said vertically extending notch mating with said auxiliary fixture.

11. A support assembly system for use with a generally horizontal bar, shaft or handle comprising:
    a body portion;
    an end portion extending upwardly from said body portion, said end portion circumferentially and frictionally gripping said generally horizontal bar, shaft or handle;
    hook means extending from said body portion for selective hooking engagement with an article to be held by said assembly; and means, integrally formed with said hook means, for removably mounting a generally cylindrical receptacle to said assembly.

12. A support assembly system for use with a generally horizontal bar, shaft or handle comprising:
a body portion;
an end portion extending upwardly from said body portion, said end portion circumferentially and frictionally gripping said generally horizontal bar, shaft or handle;
hook means extending from said body portion for selective hooking engagement with an article to be held by said assembly; and
means for removably mounting a generally cylindrical receptacle to said assembly;
wherein said hook means further comprises a first hook integrally formed with said body portion, said first hook having said means for mounting said generally cylindrical receptacle integrally formed therewith, and a second hook integrally formed with said body portion, said second hook extending from said body portion for selective hooking engagement with said article to be held by said assembly.

13. A support assembly system in accordance with claim 12 wherein said hook means further comprises a third hook integrally formed with said body portion, said second hook extending from said body portion for selective hooking engagement with a second article to be held by said assembly.

14. A support assembly system in accordance with claim 13 wherein said body portion further comprises first and second sides and wherein said second and third hooks extend from opposite ones of said first and second sides.

15. A support assembly system in accordance with claim 12 wherein each of said first and second hooks are further comprised of an inferior curved section integrally formed with said body portion, a superior curved section extending from said inferior curved section and an outwardly flared flange angled away from said superior curved section.

16. A support assembly in accordance with claim 15 wherein said first hook further comprises a reinforcing bracket integrally formed with said inferior curved section and said body portion.

17. A support assembly in accordance with claim 16 wherein said second hook further comprises a reinforcing bracket integrally formed with said inferior curved section and said body portion.

18. A support assembly in accordance with claim 12 and further comprising a fastener integrally formed at the apex of said first hook.

* * * * *